US 12,377,471 B2

(12) United States Patent
Ihara (10) Patent No.: US 12,377,471 B2
(45) Date of Patent: Aug. 5, 2025

(54) TAP HOLDER (71) Applicant: SUGINO MACHINE LIMITED, Uozu (JP)

(72) Inventor: Minoru Ihara, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 452 days.

(21) Appl. No.: 17/946,696

(22) Filed: Sep. 16, 2022

(65) Prior Publication Data
US 2023/0094334 A1 Mar. 30, 2023

(30) Foreign Application Priority Data

Sep. 29, 2021 (JP) .................. 2021-159331

(51) Int. Cl.
*B23B 31/08* (2006.01)
*B23B 31/00* (2006.01)
*B23B 31/20* (2006.01)

(52) U.S. Cl.
CPC .......... *B23B 31/083* (2013.01); *B23B 31/008* (2013.01); *B23B 31/20* (2013.01); *B23B 2231/2005* (2013.01); *B23B 2231/54* (2013.01)

(58) Field of Classification Search
CPC ..... B23B 31/083; B23B 31/008; B23B 31/20; B23B 2231/2005; B23B 2231/54; B23G 1/46
See application file for complete search history.

(56) References Cited

U.S. PATENT DOCUMENTS 3,806,973 A * 4/1974 Hopkins ............... B23B 31/083
470/96
3,999,642 A 12/1976 Johnson
4,014,421 A * 3/1977 Johnson ............ B23B 31/20125
192/48.91
(Continued)

FOREIGN PATENT DOCUMENTS

EP 2113329 A1 11/2009
EP 2727676 A1 5/2014
(Continued)

OTHER PUBLICATIONS

Office Action mailed on Sep. 27, 2022 in a corresponding Japanese Patent Application No. 2021-159331 (4 pages).
(Continued)

*Primary Examiner* — Eric A. Gates
(74) *Attorney, Agent, or Firm* — United IP Counselors, LLC (57) ABSTRACT

A tap holder having a simple structure and high runout accuracy is provided. A tap holder includes: a body having a collet holder hole having an opening toward distal end; a tap collet received in the collet holder hole, the tap collet having a tap mounting hole located at a distal end portion, and a sleeve hole located at a basal end portion; a torque transmission mechanism that transmits rotation of the body to the tap collet; a first elastic body disposed between the body and the tap collet to urge the tap collet toward distal end; a sleeve disposed to the body by received in the sleeve hole to prevent the tap collet from slipping off toward distal end; and a second elastic body disposed between the sleeve and the tap collet to urge the tap collet toward basal end.

14 Claims, 6 Drawing Sheets

(56) References Cited

U.S. PATENT DOCUMENTS

| | | | | |
|---|---|---|---|---|
| 5,915,892 | A * | 6/1999 | Glimpel | B23B 31/083 408/239 R |
| 2013/0230361 | A1* | 9/2013 | Stagge | B23B 31/005 409/234 |
| 2014/0159322 | A1* | 6/2014 | Suruga | B23G 1/46 279/9.1 |

FOREIGN PATENT DOCUMENTS

| | | | |
|---|---|---|---|
| GB | 2124951 | A | 2/1984 |
| JP | S52-16072 | A | 2/1977 |
| JP | S52-89872 | A | 7/1977 |
| JP | S52-94578 | A | 8/1977 |
| JP | S61-191854 | U | 11/1986 |
| JP | H01-135403 | A | 5/1989 |
| JP | H08-90341 | A | 4/1996 |
| JP | H11-221733 | A | 8/1999 |
| JP | 4344880 | B2 | 10/2009 |
| JP | 2014-124695 | A | 7/2014 |
| WO | 2008053606 | A1 | 5/2008 |

OTHER PUBLICATIONS

Extended European Search Report mailed on Jan. 26, 2023 in a corresponding European Patent Application No. 22194922.5 (8 pages).
Office Action mailed on Jun. 21, 2022 in a corresponding Japanese Patent Application No. 2021-159331(6 pages).
Chinese Office Action mailed on May 9, 2024 in a corresponding Chinese Patent Application No. 202211177179.9 (7 pages).

* cited by examiner

TAP HOLDER

CROSS-REFERENCE TO RELATED APPLICATIONS

This application claims the benefit of priority to Japanese Patent Application No. 2021-159331, filed on Sep. 29, 2021, the entire contents of which are hereby incorporated by reference.

BACKGROUND

1. Technical Field

The present invention relates to a tap holder.

2. Description of the Background

A proposed tap holder includes a shank, a tap holder body axially slidably received into the shank, and a first spring and a second spring disposed between the shank and the tap holder body for urging the tap holder body toward opposite direction in the axial direction to stop the tap holder body in a balanced position of the urging force (See, Japanese Patent No. 4344880). The tap holder includes an axially extending shaft member disposed on the tap holder, and a spring receiving member reciprocally disposed within the shank. The second spring urges the tap holder body in a tapping direction via the spring receiving member. The first spring is supported by the spring receiving member to urge the tap holder body in a direction opposite to the tapping direction via the shaft member.

BRIEF SUMMARY

The conventional tap holder has a complex structure.

An object of the present invention is to provide a tap holder having a simple structure and high runout accuracy.

A first aspect of the present invention provides a tap holder, including:
- a body having a collet holder hole having an opening toward distal end;
- a tap collet received in the collet holder hole, the tap collet configured to advance and retract, the tap collet having a tap mounting hole located at a distal end portion, and a sleeve hole located at a basal end portion;
- a torque transmission mechanism configured to transmit rotation of the body to the tap collet;
- a first elastic body disposed between the body and the tap collet, the first elastic body configured to urge the tap collet toward distal end;
- a sleeve disposed to the body by received in the sleeve hole, the sleeve configured to prevent the tap collet from slipping off toward distal end; and
- a second elastic body disposed between the sleeve and the tap collet, the second elastic body configured to urge the tap collet toward basal end.

The tap holder of the present invention is used for rigid tapping. Here, the rigid tapping is a process for synchronizing the rotation and the feed of the spindle at the time of screwing. A rigid tapping may also be referred to as a synchronized tapping.

The tap collet has an outer cylindrical surface that slides into the collet holder hole. The tap collet is guided by the outer cylindrical surface and the collet holder hole to move forward and backward. The tap collet includes a collet holder, a collet, and a nut. The collet holder may include a tapered hole for the collet to be mounted, a sleeve hole, and an external thread. The collet holder may further include a flange. The flange is disposed with a clear gap with a distal end surface of the body. The tapered hole may be connected to the sleeve hole. The collet has a tap mounting hole. The nut is fastened with the tap and the collet to the external thread.

The body may include a shank. The body may have an internal thread. The sleeve is fixed to the internal thread. The sleeve may have a through-hole. The sleeve may be fixed to the internal thread with a bolt received in the through-hole.

The key is a sliding key. Preferably, a plurality of keys are arranged. The keys are arranged rotationally symmetrically about a central axis of the body.

The first elastic body is, for example, a disc spring or an elastic ring. The second elastic body is, for example, a disc spring or an elastic ring. The elastic ring has, for example, a circular or rectangular cross-sectional shape. The elastic ring is made of, for example, rubber or plastic. The first elastic body and the second elastic body are attached by being compressed more than the free length.

The amount of expansion and contraction of the first elastic body and the second elastic body may be limited.

For example, the first elastic body is disposed in a groove located on a basal end surface of the tap collet. The groove is, for example, a circumferential groove. The first elastic body may be disposed between a basal end surface of the flange disposed on the collet holder and a distal end surface of the body. The basal end surface of the tap collet and the basal end surface (bottom surface) of the collet holder hole face each other with a slight first gap in between. The first elastic body can be compressed by the width of the first gap. The first elastic body urges the tap collet toward distal end by the restoring force.

The second elastic body is held between the flange and the sleeve hole. A portion of the sleeve may be configured for direct impact with the sleeve hole. For example, a medium-diameter portion may be provided between the small-diameter portion of the sleeve and the flange portion, and a basal end surface of the medium-diameter portion may face the end surface of the large-diameter portion of the sleeve hole with a slight second gap. At this time, the second elastic body can be compressed by the width of the second gap.

The torque transmission mechanism is, for example, a key or a spline. The torque transmission mechanism has a small clearance in the rotation direction.

The present invention provides a tap holder having a simple structure and high runout accuracy.

DETAILED DESCRIPTION

First Embodiment

Figure 1:
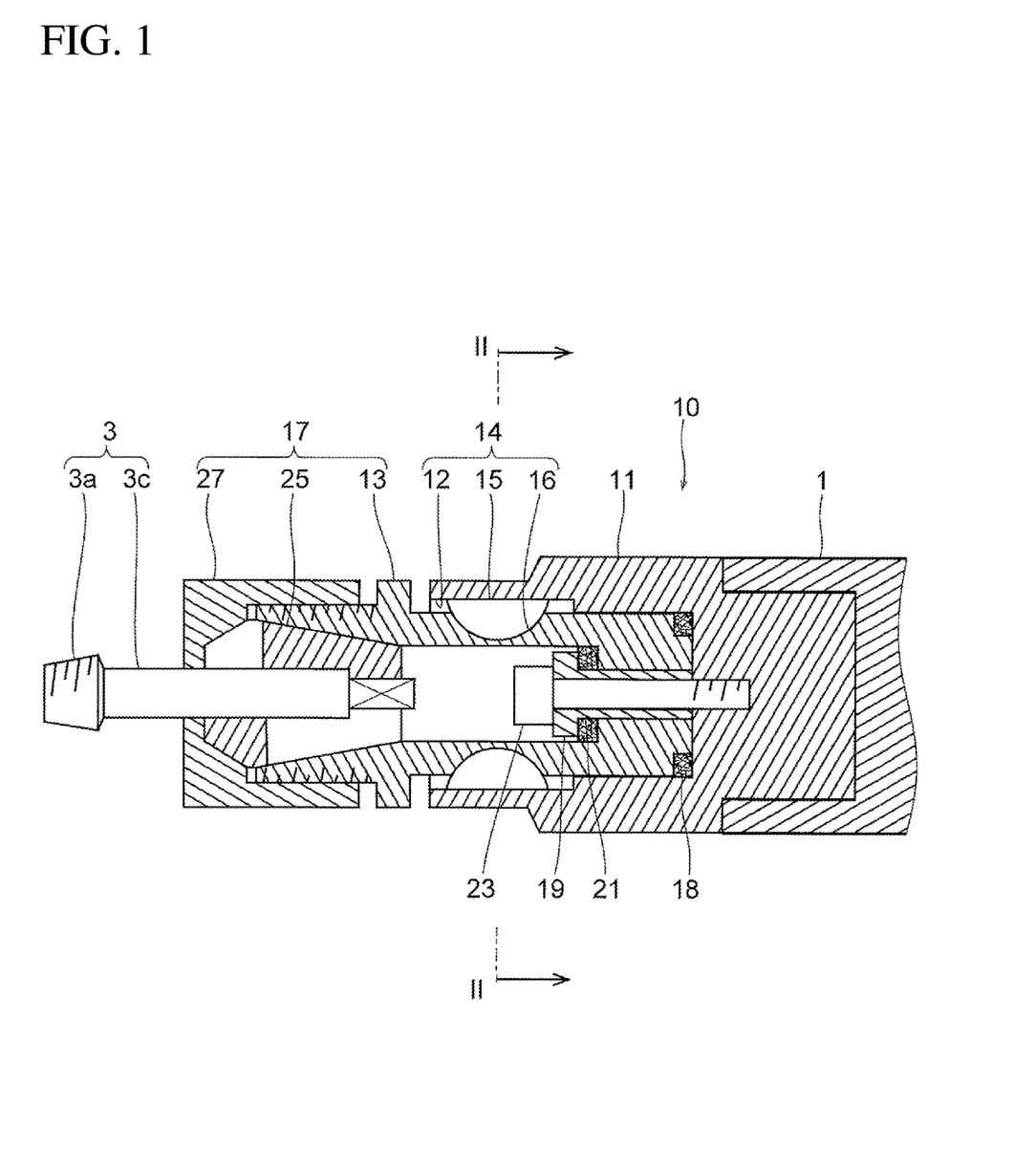
FIG. 1 is a vertical cross-sectional view of a tap holder according to a first embodiment.

As shown in FIG. 1, a tap holder 10 according to the present embodiment includes a body 11, a torque transmission mechanism 14, a tap collet 17, a first elastic ring (first elastic body) 18, a sleeve 19, a second elastic ring (second elastic body) 21, and a bolt 23. FIG. 1 shows a cross-sectional view taken along line I-I of FIG. 2. The tap holder 10 is mounted on, for example, a spindle 1 of a machining apparatus. A tap 3 is attached to the tap holder 10.

The torque transmission mechanism 14 includes a second keyway 12, a first keyway 16, and a woodruff key 15. The tap collet 17 includes a collet holder 13, a collet 25, and a nut 27.

Figure 3:
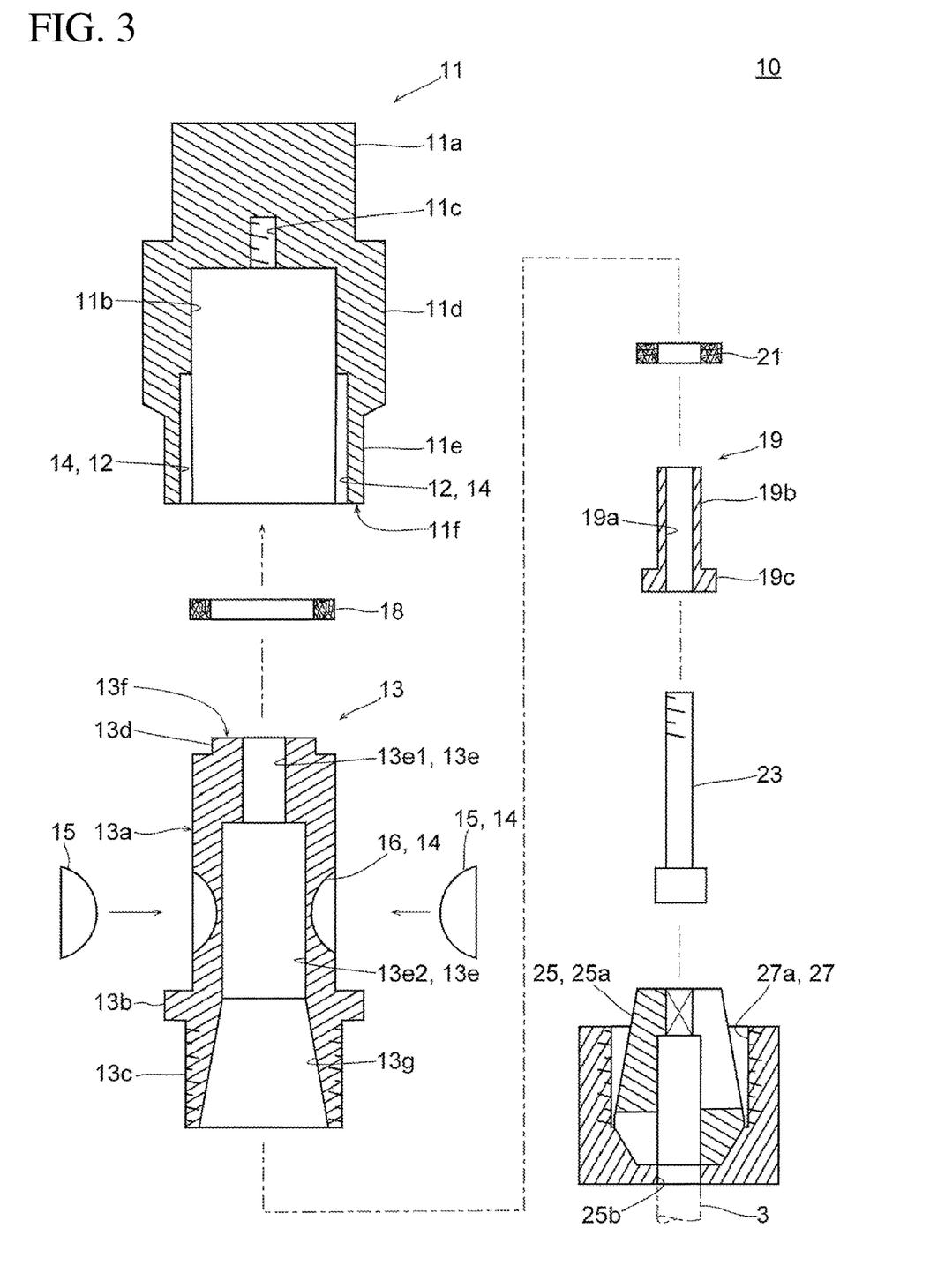
FIG. 3 is an exploded view (vertical sectional view) of the tap holder according to the first embodiment.

FIG. 3 is an exploded view for each component shown in the cross-sectional view taken along the line I-I. As shown in FIG. 3, the body 11 includes a shank 11a, a large-diameter portion 11d, a collet holder hole 11b, a second keyway 12, an internal thread 11c, and a distal end surface 11f. The body 11 may have a small-diameter portion 11e. The shank 11a is, for example, a straight shank. The large-diameter portion 11d has, for example, a cylindrical shape and has a larger diameter than the shank 11a. The shank 11a is attached to a spindle hole. The large-diameter portion 11d may be in close contact with an end surface of the spindle 1. The small-diameter portion 11e is disposed at a distal end portion of the body 11. The collet holder hole 11b, which is a bottomed cylindrical hole, is disposed coaxially with the shank 11a. The collet holder hole 11b opens at the distal end surface 11f of the body 11. The cylindrical surface of the collet holder hole 11b is smooth. The second keyway 12 is a keyway for sliding. The second keyway 12 extends from the distal end surface 11f to a middle portion of the collet holder hole 11b. The second keyways 12 are rotational symmetrically disposed about a central axis of the shank 11a. The body 11 of the present embodiment has two second keyways 12. The internal thread 11c is arranged at a center of the bottom surface of the collet holder hole 11b.

The collet holder 13 is received in the collet holder hole 11b. The collet holder 13 has a hollow cylindrical shape. The collet holder 13 includes an outer cylindrical surface 13a, a circumferential groove 13d, a first keyway 16, a flange 13b, an external thread 13c, a tapered hole 13g, and a sleeve hole 13e. The sleeve hole 13e is a stepped through-hole. The sleeve hole 13e has a large-diameter portion 13e2 and a small-diameter portion 13e1.

The circumferential groove 13d, the outer cylindrical surface 13a, the flange 13b, and the external thread 13c are arranged to form the outer surface of the collet holder 13 in this order from the basal end. The circumferential groove 13d is a circumferential groove having a rectangular cross section and disposed on a basal end surface 13f of the collet holder 13. The outer cylindrical surface 13a has a smooth surface and substantially the same diameter as the collet holder hole 11b. The first keyway 16, which is a woodruff keyway, is disposed at a distal end portion of the outer cylindrical surface 13a. The flange 13b, which has a larger diameter than the outer cylindrical surface 13a, has a disk shape. A spanner engaging portion (e.g., two parallel surfaces) is disposed on the flange 13b.

The external thread 13c extends to a distal end of the collet holder 13. The tapered hole 13g, which is a conical surface having a large diameter toward the tip, is connected to the large-diameter portion 13e2. The large-diameter portion 13e2 and the small-diameter portion 13e1 have cylindrical surfaces. The large-diameter portion 13e2 has a larger diameter than the small-diameter portion 13e1. The circumferential groove 13d, the external thread 13c, the tapered hole 13g, and the sleeve hole 13e are coaxial with the outer cylindrical surface 13a.

The first elastic ring 18 is an annular ring having a rectangular cross section. The material of the first elastic ring 18 is natural rubber or synthetic rubber. The length of the first elastic ring 18 in the axial direction is slightly longer than the length of the circumferential groove 13d. The first elastic ring 18 is attached to the circumferential groove 13d.

The woodruff key 15 is attached to the first keyway 16. The woodruff key 15 and the collet holder 13 integrally reciprocate in the body 11 in the axial direction of the shank 11a. At this time, the outer cylindrical surface 13a slides on the cylindrical surface of the collet holder hole 11b to be guided. The woodruff key 15 slides in the second keyway 12.

The sleeve 19 includes a flange 19c, a cylindrical portion 19b, and a through-hole 19a. An outer diameter of the cylindrical portion 19b is substantially the same as an inner diameter of the small-diameter portion 13e1. The length of the cylindrical portion 19b is slightly shorter than the sum of the length of the small-diameter portion 13e1 and the length of the second elastic ring 21. An outer diameter of the flange 19c is substantially to the same as an inner diameter of the large-diameter portion 13e2. The through-hole 19a penetrates the center of the sleeve 19.

The second elastic ring 21 is an annular ring having a rectangular cross section. The material of the second elastic ring 21 is natural rubber or synthetic rubber. The second elastic ring 21 is attached to the cylindrical portion 19b to be held between the flange 19c and a bottom surface of the collet holder hole 11b.

The bolt 23 passes through the through-hole 19a and the small-diameter portion 13e1 to be screwed to the internal thread 11c. Thus, the bolt 23 fixes the sleeve 19 to the body 11. When the sleeve 19 is fastened to the body 11, the first elastic ring 18 and the second elastic ring 21 are compressed. The first elastic ring 18 presses the collet holder 13 toward the distal direction by the restoring force. The second elastic ring 21 presses the collet holder 13 toward the basal direction by the restoring force. In addition, the sleeve 19 prevents the tap collet 17 from slipping off toward the distal direction.

The collet 25 has a collet taper 25a. The collet taper 25a has the same taper angle as the tapered hole 13g. The nut 27 has a nut screw 27a. The collet taper 25a is in close contact with the tapered hole 13g. The nut screw 27a fits into the external thread 13c. The collet 25 is attached to the nut 27 and fastened to the collet holder 13 together with the tap 3. Tightening the nut 27 causes to apply a component force of the fastening force of the nut 27 on the collet 25 radially inward from the tapered hole 13g. Thus, the tap 3 is fastened to the collet holder 13.

The bolt 23 may be integrally formed with the sleeve 19. In this case, the through-hole 19a may be eliminated.

Rigid tapping is performed using the tap holder 10 of the present embodiment. In rigid tapping, the spindle 1 is fed toward distal end direction in synchronization with the rotation speed of the spindle 1 so as to align with the screw lead while the spindle 1 is forwardly rotated, and thus the tapped hole is machined. When the tap depth reaches a predetermined depth, the spindle 1 is temporarily stopped. Thereafter, the spindle 1 is reversely rotated, and the spindle 1 is returned toward the basal direction in synchronization with the rotation speed of the spindle 1 so as to be aligned with the screw lead. In the tap 3, a lead error, a forward/reverse inversion error, and a feed error of the spindle may occur. In the tap holder 10 of the present embodiment, the tap collet 17 is slightly shifted in the front-rear direction to move the tap 3 in accordance with the screw lead of the tap 3. Thus, the tapping process is performed without the screw thread collapsing.

As shown in FIG. 1, the outer cylindrical surface 13a slides and is guided in the collet holder hole 11b. Thus, when the body 11 rotates, the runout of the tap collet 17 is reduced.

Figure 2:
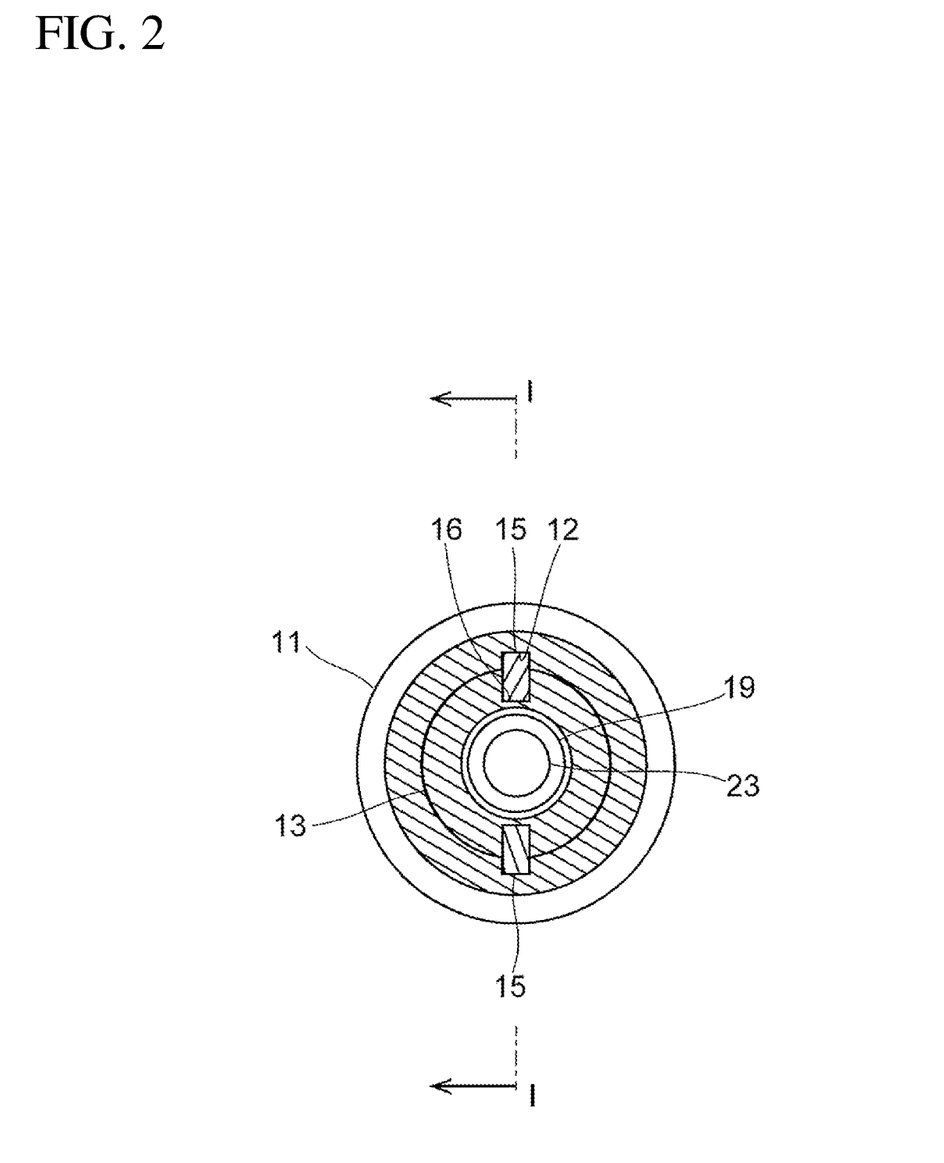
FIG. 2 is a cross-sectional view taken along line II-II of FIG. 1.

As shown in FIG. 2, the torque transmission mechanism 14 including a sliding key (woodruff key 15) has small clearance in the rotation direction. Thus, the rotation of the tap collet 17 follows the rotation of the body 11 well. In particular, the spindle 1 (body 11) reverses the rotation at the end point of the tapping process. At this time, the rotation of the tap collet 17 is delayed from the rotation of the spindle 1 by the clearance in the rotation direction. If the rotation of the tap collet 17 is greatly delayed, the tap 3 is firstly retracted without being absorbed by the second elastic ring 21. This may deteriorate the screw accuracy, such as by pulling off the screw.

In the tap holder 10 of the present embodiment, the torque transmission mechanism 14 has small clearance, which reduces the rotational delay of the tap collet 17 with respect to the body 11. This also eliminates fine adjustment of the timings of the forward and reverse of the rotation and the feed timing.

As the torque transmission mechanism 14 has the woodruff key 15, the first keyway 16 is a woodruff keyway. Thus, the collet holder 13 is easily manufactured.

Figure 4:
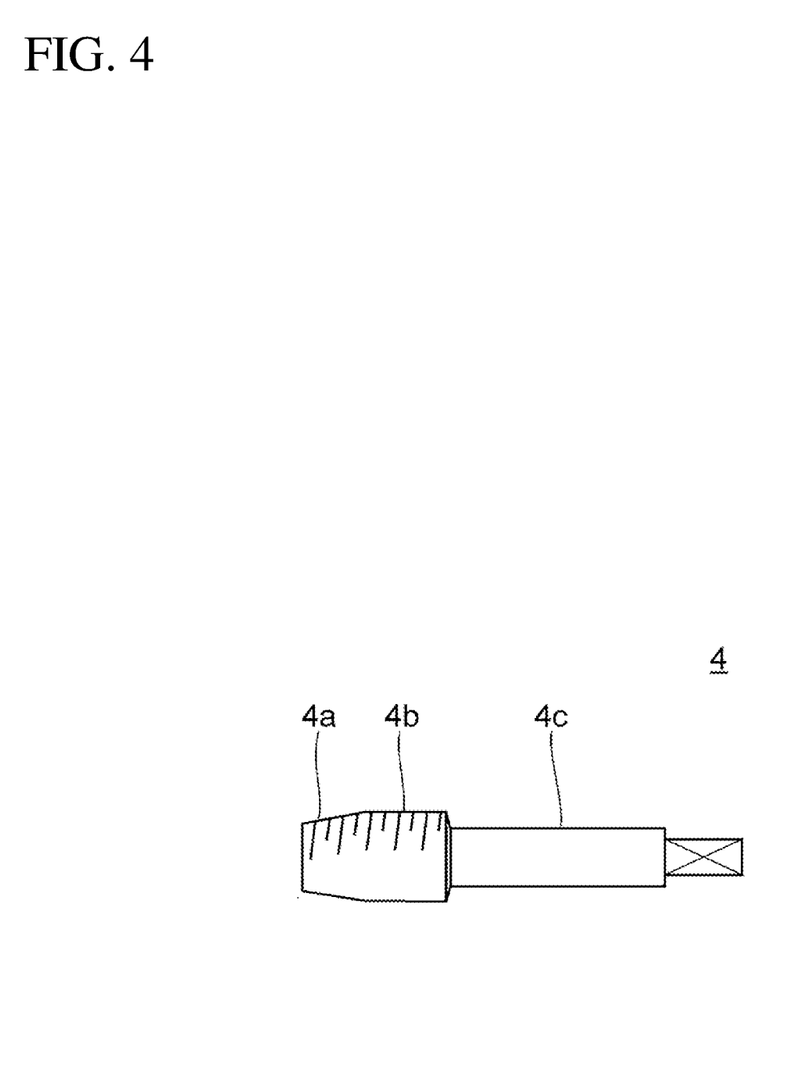
FIG. 4 is a side view of a typical tap.

When the coil spring is used as the first elastic body or the second elastic body, if the rotation speed of the spindle 1 increases, the screw may collapse. For example, when the tap 3 which is a spiral tap is used, the tap 3 is pulled in the processing direction. As shown in FIG. 4, the typical tap 4 includes a biting portion 4a, a guide portion 4b, and a shank portion 4c. When the tap 4 includes the guide portion 4b, the guide portion 4b is guided to the thread processed by the biting portion 4a, and the feed amount of the tap 4 is self-adjusted to the lead feed. Further, since the guide portion 4b is supported by the machined thread, the tensile force received by the tap 4 is dispersed and applied on the machined thread and the guide portion 3b. Then, the screw thread is less likely to collapse.

On the other hand, as shown in FIG. 1, the tap 3 for rigid tapping includes the biting portion 3a and the shank portion 3c, and does not include a guide portion. When processing is performed using the tap 3 without the guide portion, the feed amount of the tap 3 is not self-adjusted to the lead of the tap 3. Thus, the rigid tapping process requires to synchronize the traveling speed of the tap 3 with the rotation speed of the tap 3. Here, the coil spring has a large amount of expansion and contraction, and a small restoring force. When a coil spring is used as the first elastic body or the second elastic body, the feed amount of the tap 3 may be largely deviated from the lead of the tap 3. When a coil spring is used, the thread depth becomes deeper, which is likely to cause machining failure.

The tap holder 10 of the present embodiment includes a first elastic ring 18 that is a first elastic body and a second elastic ring 21 that is a second elastic body. The axial length of the first elastic ring 18 and the second elastic ring 21 is short. In addition, the first elastic ring 18 and the second elastic ring 21 have high elastic moduli. Thus, the amount of advancement and retraction of the tap collet 17 with respect to the body 11 is small.

The tap holder 10 of the present embodiment has a small amount of expansion and contraction of the first elastic ring 18 and the second elastic ring is small, and has an elastic force with a constant force. The tap collet 17 is thus adjusted by a small amount in accordance with the lead of the tap 3. This improves the machining accuracy.

The basal end surface 13f of the collet holder 13 and the bottom surface of the collet holder hole 11b define a small gap. Thus, when the collet holder 13 is largely retracted with respect to the body 11, the collet holder 13 collides with the collet holder hole 11b. This determines the retraction width of the collet holder 13. The limited retraction width of the collet holder 13 suppresses the breakage of the first elastic ring 18 due to excessive retraction of the collet holder 13.

As described above, the tap holder 10 of the present embodiment is suitably used for tapping at high speed rotation.

Second Embodiment

Figure 5:
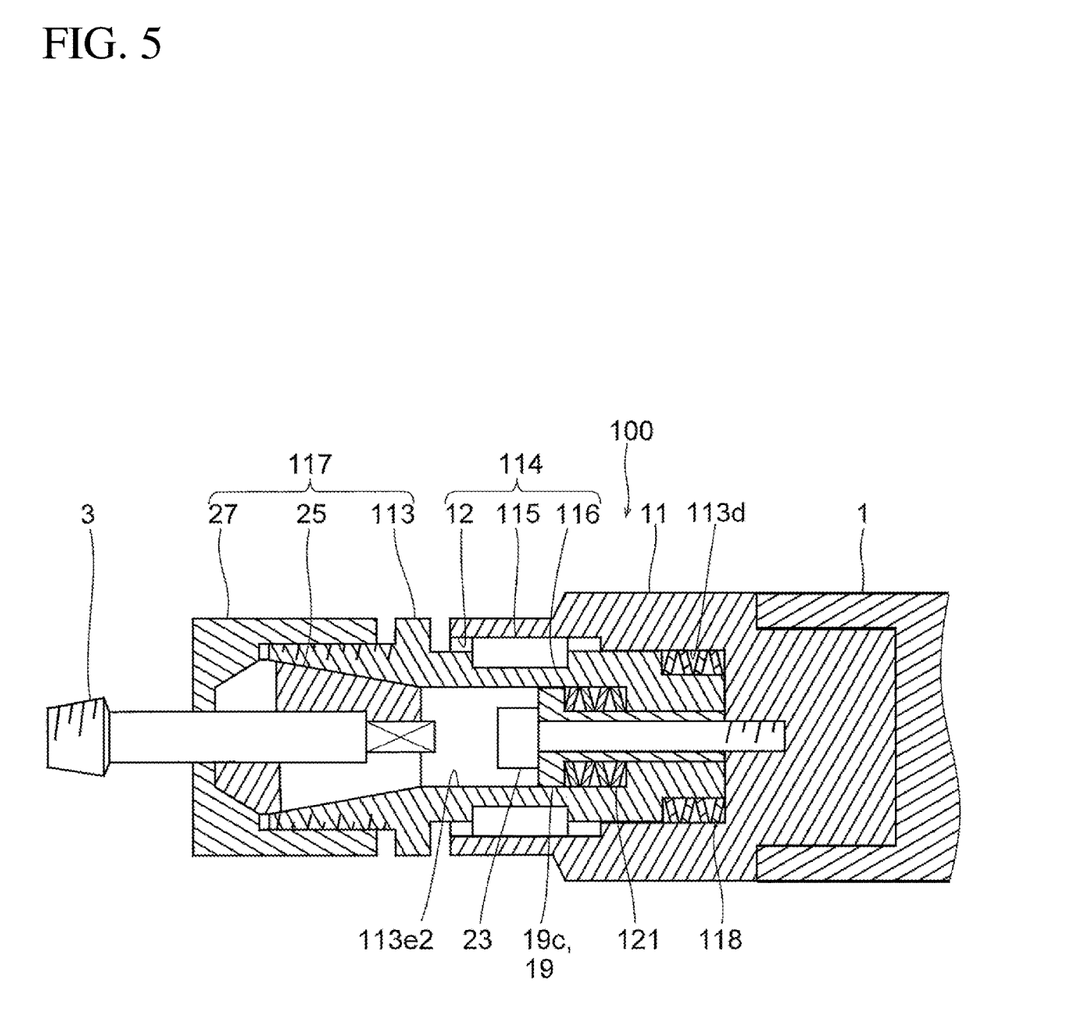
FIG. 5 is a longitudinal sectional view of a tap holder according to a second embodiment.

As shown in FIG. 5, the tap holder 100 of the present embodiment includes a tap collet 117, a torque transmission mechanism 114, a disc spring (first elastic body) 118, and a disc spring (second elastic body) 121. The tap collet 117 includes a collet holder 113. Other configurations of the tap holder 100 are substantially the same as those of the tap holder 10 of the first embodiment.

The collet holder 113 has a circumferential groove 113d that is deeper in the axial direction of the shank 11a than the circumferential groove 13d of the first embodiment. The disc spring 118 is disposed between the circumferential groove 113d and the collet holder hole 11b. Preferably, a plurality of disc springs 118 are disposed between the circumferential groove 113d and the collet holder hole 11b.

The collet holder 113 includes a large-diameter portion 113e2 that is deeper in the axial direction of the shank 11a than the large-diameter portion 13e2 of the first embodiment. The flange 19c and the large-diameter portion 113e2 define a deep space. The disc spring 121 is disposed between the flange 19c and the large-diameter portion 113e2. Preferably, a plurality of disc springs 121 are disposed between the flange 19c and the large-diameter portion 113e2.

The torque transmission mechanism 114 includes a first keyway 116, a parallel key 115, and a second keyway 12. The first keyway 116 is a rectangular groove. The parallel key 115 is fastened to the first keyway 116 and slides on the second keyway 12.

The parallel key 115 fastened to the first keyway 116 suppresses inclination of the parallel key 115 with respect to the first keyway 116. The first elastic body and the second elastic body, which are disc springs 118 and 121, have high durability.

Third Embodiment

Figure 6:
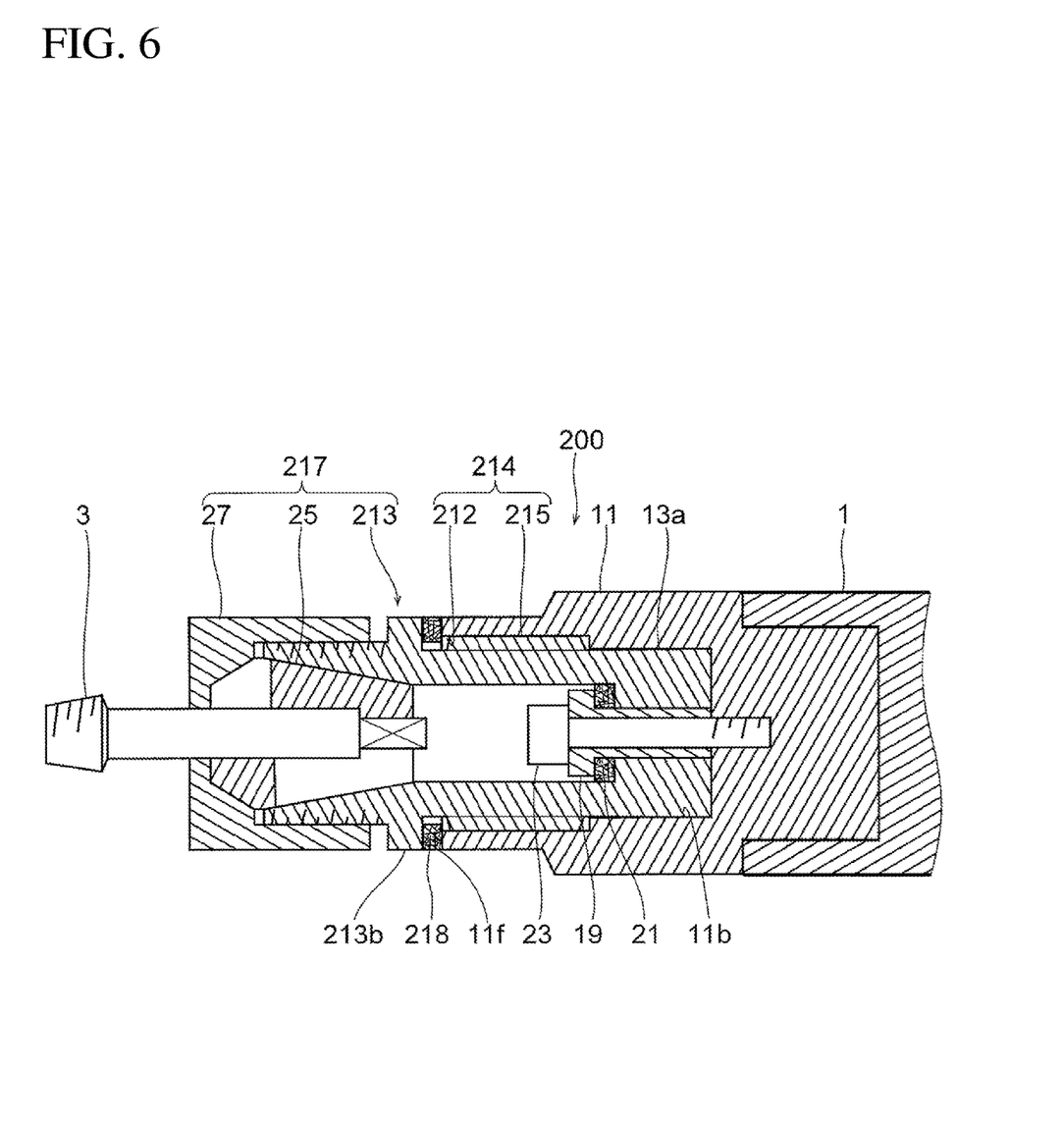
FIG. 6 is a longitudinal sectional view of a tap holder according to a third embodiment.

As shown in FIG. 6, the tap holder 200 of the present embodiment includes a tap collet 217, a torque transmission mechanism 214, and a first elastic ring 218. The tap collet 217 includes a collet holder 213. The first elastic ring 218 is received between the body 11 and the flange 213b. Other configurations of the tap holder 200 are substantially the same as those of the tap holder 10 of the first embodiment.

The torque transmission mechanism 214 includes a spline hole 212 and a spline shaft 215. The spline hole 212 is disposed at a distal end portion of the collet holder hole 11b. The spline shaft 215 is disposed at a distal end portion of the outer cylindrical surface 13a of the collet holder 213. The spline shaft 215 fits into the spline hole 212 and slides in the axial direction of the shank 11a.

The collet holder 213 does not have the circumferential groove 13d in the first embodiment. The first elastic ring 218 is received between the distal end surface 11f and the flange 213b.

The torque transmission mechanism 214, which is a spline, has a small circumferential clearance of the collet holder 213 with respect to the body 11.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST 10, 100, 200 Tap holder
11 Body
11b Collet holder hole
13e Sleeve hole
14, 114, 214 Torque transmission mechanism
17, 117, 217 Tap collet
18, 118, 218 First elastic body
19 Sleeve
21, 121 Second elastic body
25b Tap mounting hole

What is claimed is:

1. A tap holder, comprising:
a body having a collet holder hole having an opening toward distal end;
a tap collet received in the collet holder hole, the tap collet configured to advance and retract, the tap collet having a tap mounting hole located at a distal end portion, and a sleeve hole located at a basal end portion;
a torque transmission mechanism configured to transmit rotation of the body to the tap collet;
a first elastic body disposed between the body and the tap collet, the first elastic body configured to urge the tap collet toward distal end;
a sleeve disposed in the body by being received in the sleeve hole, the sleeve configured to prevent the tap collet from slipping off toward distal end; and
a second elastic body disposed between the sleeve and the tap collet, the second elastic body configured to urge the tap collet toward basal end;
wherein the sleeve hole is a stepped through-hole, the sleeve hole has
a large-diameter portion located at a distal end portion, and
a small-diameter portion located at a basal end portion,
the sleeve includes
a flange having a larger diameter than the small-diameter portion, the flange disposed inside the large-diameter portion, and
a cylindrical portion received in the small-diameter portion, and
the second elastic body is disposed between the flange and the large-diameter portion.

2. The tap holder according to claim 1, wherein
the tap collet includes
a first keyway located on the tap collet,
a second keyway located on the collet holder hole, and
a key disposed either one of the first keyway and the second keyway to slide the other one of the first keyway and the second keyway.

3. The tap holder according to claim 2, wherein
the key is a woodruff key disposed in the first keyway.

4. The tap holder according to claim 3, wherein
the first elastic body is disposed between the collet holder hole and the tap collet.

5. The tap holder according to claim 3, wherein
the first elastic body is disposed between a distal end surface of the body and the tap collet.

6. The tap holder according to claim 2, wherein
the first elastic body is disposed between the collet holder hole and the tap collet.

7. The tap holder according to claim 2, wherein
the first elastic body is disposed between a distal end surface of the body and the tap collet.

8. The tap holder according to claim 1, wherein
the torque transmission mechanism includes
a spline shaft disposed on the tap collet, and
a spile hole located in the body for the spline shaft to slide.

9. The tap holder according to claim 8, wherein
the first elastic body is disposed between the collet holder hole and the tap collet.

10. The tap holder according to claim 8, wherein
the first elastic body is disposed between a distal end surface of the body and the tap collet.

11. The tap holder according to claim 1, wherein
the first elastic body is disposed between the collet holder hole and the tap collet.

12. The tap holder according to claim 1, wherein
the first elastic body is disposed between a distal end surface of the body and the tap collet.

13. The tap holder according to claim 1, wherein
the first elastic body is an elastic ring or a disc spring.

14. The tap holder according to claim 1, wherein
the second elastic body is an elastic ring or a disc spring.

* * * * *